F. E. BLAISDELL.
TIRE.
APPLICATION FILED JAN. 31, 1911.
1,017,732.
Patented Feb. 20, 1912.
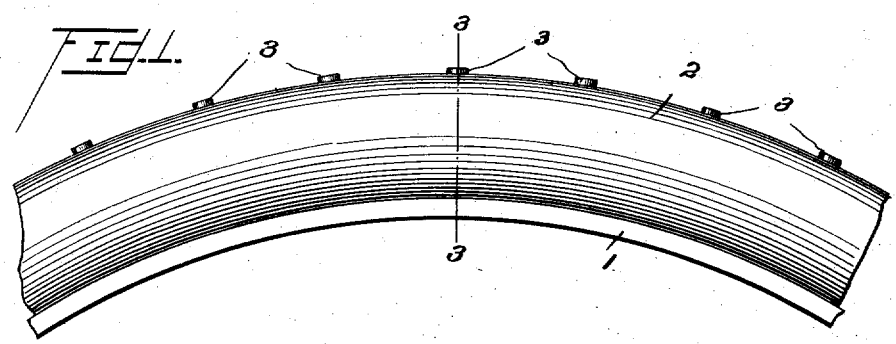
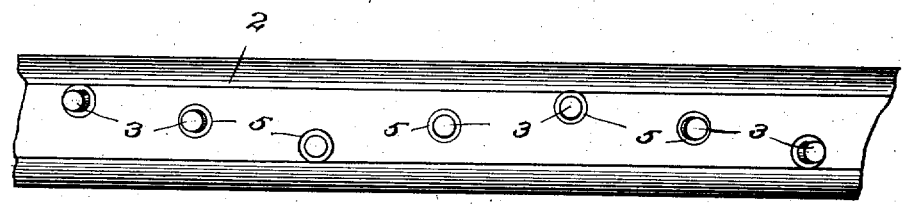
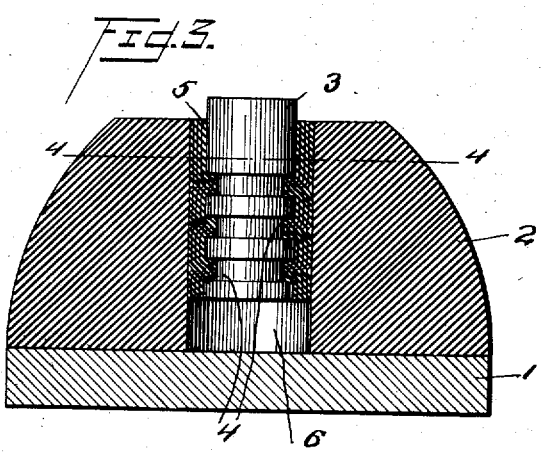
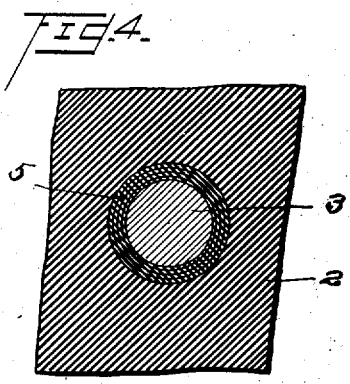
Witnesses
H. Strauss
R. H. Krenkel
Inventor
Frederick E. Blaisdell,
By Joshua R. H. Potts.
Attorney
COLUMBIA PLANOGRAPH CO., WASHINGTON, D. C.

UNITED STATES PATENT OFFICE.

FREDERICK E. BLAISDELL, OF PHILADELPHIA, PENNSYLVANIA.

TIRE.

1,017,732. Specification of Letters Patent. Patented Feb. 20, 1912.

Application filed January 31, 1911. Serial No. 605,694.

*To all whom it may concern:*

Be it known that I, FREDERICK E. BLAISDELL, a citizen of the United States, residing at Philadelphia, in the county of Philadelphia and State of Pennsylvania, have invented certain new and useful Improvements in Tires, of which the following is a specification.

My invention relates to improvements in tires, and more particularly to improved tires for preventing slipping and skidding, the object of the invention being to provide a tire with an improved arrangement and construction of metallic stud, said studs being located in various positions throughout the periphery of the tire and contacting with the ground.

A further object is to mount the stud in the tire as to allow a cushioning movement of the stud, and yet so hold the stud as to sustain great weight and prevent displacement from its operative position.

A further object is to so mount the stud in means for elastically binding the metal stud, enabling its ready attachment in a socket in a tire by ordinary vulcanizing.

A further object is to provide a stud of this character which may be sold to the trade, and which may be fixed to a tire by any one of average intelligence.

With these and other objects in view, the invention consists in certain novel features of construction and combinations and arrangements of parts, as will be more fully hereinafter described and pointed out in the claims.

In the accompanying drawings: Figure 1, is a fragmentary view in side elevation illustrating my improvements. Fig. 2, is a plan view of Fig. 1. Fig. 3, is an enlarged view in section on the line 3—3 of Fig. 1, and Fig. 4, is a sectional view on the line 4—4 of Fig. 3.

1, represents a metal rim of any construction, and 2 a rubber tire. While I have shown my improvements in connection with a solid tire and a plain rim, it is to be understood that the invention is in no wise limited to the style of tire or rim, but may be attached to any tire either solid, cushion, or pneumatic, but is especially designed for use in connection with motor vehicles employing solid rubber tires.

A metal stud 3 is employed and is preferably provided with annular grooves 4. Around this stud 3, strip rubber 5 is wound under tension, said windings of the rubber being secured together by rubber cement, or other adhesive, so that the several windings become, in effect, a single tightly gripping elastic covering for the stud. This covering grips the stud and projects into the grooves 4 of the stud so as to positively prevent longitudinal movement in the covering, and as clearly shown in Fig. 3, the outer end of the stud projects beyond the cover to contact with the ground.

The tire 2 is provided with an opening or socket 6, into which the covered stud is secured preferably by the cold vulcanizing process, which is well known. The opening or socket 6 is deeper than the stud is long, so that a pocket is formed at the inner end of the stud. This permits the stud to move inwardly as permitted by the elasticity of the cover and the tire, yet always firmly contacted with the ground to prevent skidding. This elastic mounting of the stud is essential, otherwise the utility of the rubber tire would be rendered null, as the entire weight would be supported on the studs. This is not my intention, but merely to provide studs which do not sustain all the weight, but firmly grip the ground and prevent skidding.

My invention is in no wise limited to the exact manner of assembling the parts, to the exact form of the stud, or to their immaterial details as specifically described, but is broadly to the idea of a stud having an elastic cover and secured in a tire with a pocket back of the stud and cover to allow movement of the stud and so secure the stud in the tire as to prevent it from being forced inwardly or outwardly from its operative position.

The studs may be sold to the trade and attached by dealers or owners, or the tire may be assembled by the manufacturer.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An anti-skidding stud for tires having an elastic cover wound thereon under tension.

2. An anti-skidding stud for tires and having an elastic cover wound thereon under tension, the outer surface of the stud uneven, whereby the cover interlocks with the surface thereof.

3. A tire having an opening therein, a stud, an elastic covering secured on said stud, and said elastic covering secured in said opening, said stud terminating short of the inner end of the opening forming a clearance space, and at its other end extending out beyond the tire.

4. A tire having a plurality of openings therein, elastically covered studs secured in said openings extending beyond the outer face of the tire, and said studs with their coverings terminating short of the inner ends of the openings, whereby pockets are formed of substantially the same diameter as the covered studs.

5. An elastic tire having a plurality of openings extending entirely through the same, and studs secured in said openings projecting beyond the face of the tire, and at their inner ends terminating short of the inner ends of the openings.

6. An elastic tire having a plurality of openings extending entirely through the same, and studs secured in said openings projecting beyond the face of the tire, and at their inner ends terminating short of the inner ends of the openings, said studs composed of a central metal core, and an elastic covering wound thereon under tension, and secured in the openings.

In testimony whereof I have signed my name to this specification in the presence of two subscribing witnesses.

FREDERICK E. BLAISDELL.

Witnesses:
CHAS. E. POTTS,
R. H. KRENKEL.

---

Copies of this patent may be obtained for five cents each, by addressing the "Commissioner of Patents, Washington, D. C."